No. 744,688. PATENTED NOV. 17, 1903.
C. H. E. MEYER.
FENCE POST.
APPLICATION FILED MAR. 12, 1903.
NO MODEL.
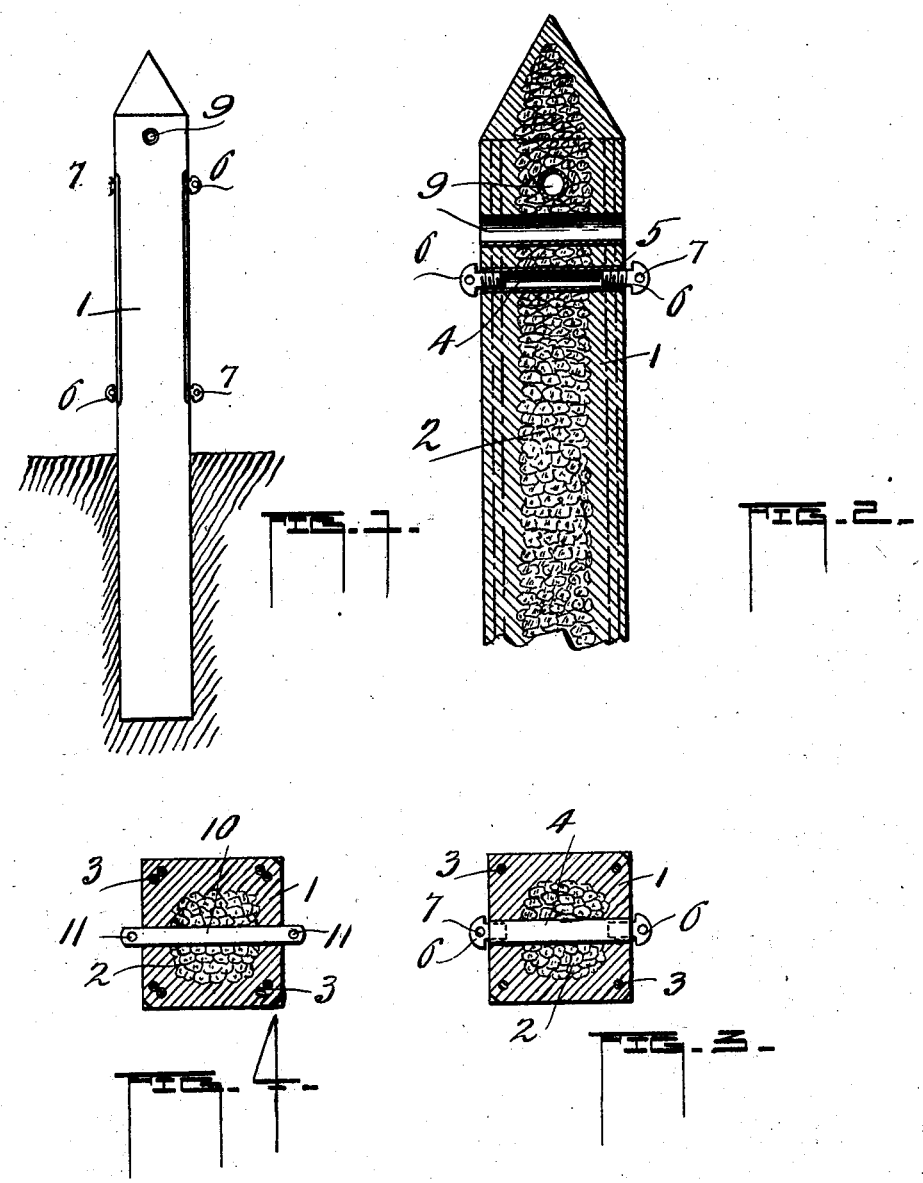

No. 744,688. Patented November 17, 1903.

UNITED STATES PATENT OFFICE.

CARL H. E. MEYER, OF PEORIA, ILLINOIS.

FENCE-POST.

SPECIFICATION forming part of Letters Patent No. 744,688, dated November 17, 1903.

Application filed March 12, 1903. Serial No. 147,391. (No model.)

*To all whom it may concern:*

Be it known that I, CARL H. E. MEYER, a citizen of the United States, residing at Peoria, in the county of Peoria and State of Illinois, have invented certain new and useful Improvements in Fence-Posts; and I do hereby declare that the following is a full, clear, and exact description of the invention, which will enable others skilled in the art to which it appertains to make and use the same.

This invention has reference to fence-posts, and particularly to that class of fence-posts formed of plastic material, in this instance Portland cement; and the object which I have in view is to produce a cheap, durable, and useful fence-post of plastic material having a center core or filler of washed rock or gravel and strengthened by embedded corner-rods and transverse hollow tubes, the latter adapted to have attached thereto threaded and perforated plugs by means of which a fence is supported by the post.

Further objects will definitely appear in the detailed description to follow.

I accomplish the objects of my invention by the devices and means described in this specification.

That my invention may be more fully understood, reference is had to the accompanying drawings, in which—

Figure 1 is an elevation of a fence-post embodying my invention. Fig. 2 is a view of the post enlarged, showing a portion of such post and in vertical sectional elevation. Fig. 3 is a horizontal cross-section. Fig. 4 is a horizontal cross-section showing a modified embedded bar.

The mode of manufacturing my improved post is to provide a suitable mold or flask of the proper length and design. Making the post, as I intend, of Portland cement, a layer of such cement is placed in the mold or flask and a longitudinal rod placed in each corner of the post then formed. Another layer of cement is placed in the mold, embedding the rods previously placed, and transverse hollow tubes such as I shall describe are embedded in the material at desired points. These tubes are then covered by a layer of cement and a longitudinal rod placed in the corners of the post opposite to those previously placed and the entire series of rods and tubes embedded by an additional layer of cement, after which the mold may be subjected to pressure for compressing the material or the material may remain in the mold until it becomes solidified and hardened, after which a finished post may be removed from the mold. During the molding process I provide a center core or filler for the post of washed rock or similar substance, which strengthens the post and lessens the cost of manufacture, as the post may be formed of the composition cement or rock or cement alone.

Referring to the figures, in which similar numerals of reference relate to corresponding parts, 1 is the body of the post, of any desired composition, but Portland cement is preferred, having the center core or filler of washed rock or similar material 2, and the post may be of any other shape than that shown in the drawings. Extending longitudinally of the post and embedded within the same and forming corner-braces thereof are metal rods 3, which may be a single rod or two rods twisted together, (shown in cross-section in Fig. 4,) around which the composition for the body of the post is cast.

4 indicates transversely and horizontally disposed hollow tubes, which extend through the center of the post and are embedded therein during the formation of the post and in such a manner that their opposite ends are flush with the surface of the post. The inner walls of the tubes 4 at their opposite ends are threaded, as at 5.

6 indicates threaded plugs adapted to be screwed into the open ends of the tubes 4, and such plugs are provided with the perforations 7, as shown. The object of these threaded plugs is to retain or support a fence upon the post. If wire strands are employed in the make-up of the fence, they are attached in a suitable manner to the plugs by being passed through the perforations, and if boards be employed they are attached to the posts by the plugs which support the boards and are in turn screwed into the tubes, all of which, it is believed, will be understood.

At a suitable point near the top of the post, if it is designed to employ the post as a hitching-post, I embed in the body thereof during the cast the hollow bodies of tubes 9, which are slightly larger in diameter than the tubes 4 and at right angles to each other, through which a hitching-strap or a rope may be passed and fastened. These bodies may be added to the posts as a means of strengthening the post in addition to the rods and threaded tubes, if desired, or dispensed with entirely if the post is to be a fence-post, or the threaded tubes may be dispensed with if the post is employed for a hitching-post.

In Fig. 4 as a substitute for the tubes 4 I employ a metal bar 10 of suitable width and thickness, which has the oppositely-placed holes 11, to which may be attached the fencing described as attached to the plugs 6. In using the bars 10 it may be convenient to leave them in during the molding or removed, as some may desire the post without.

Having thus fully described my invention, what I claim, and desire to secure by Letters Patent of the United States, is—

1. A post of plastic material, a series of tubular bodies arranged transversely in the post, plugs having screw connection with the ends of the tubes and perforated for the purposes specified.

2. In combination with a plastic post having strengthening means at its four corners, of transverse bodies embedded in the post and adjustable sustaining means having connection with the transverse bodies, for the purposes specified.

In testimony whereof I affix my signature in presence of two witnesses.

CARL H. E. MEYER.

Witnesses:
ABRAHAM JACOBSON,
CHAS. W. LA PORTE.